W. J. WILCOX.
Lard Cooler.
No. 37,120. Patented Dec. 9, 1862.
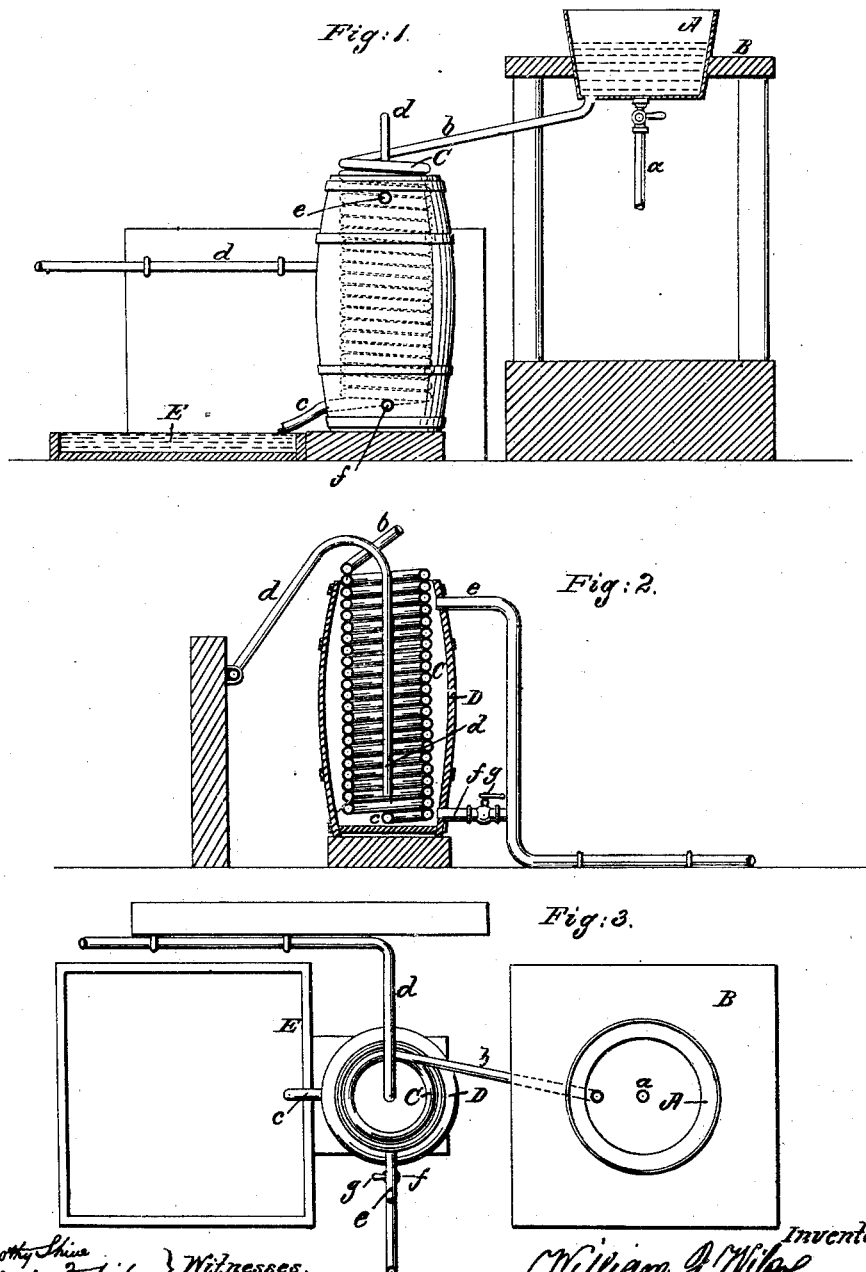

UNITED STATES PATENT OFFICE.

WILLIAM J. WILCOX, OF NEW YORK, N. Y.

IMPROVED APPARATUS FOR COOLING LARD.

Specification forming part of Letters Patent No. 37,120, dated December 9, 1862.

*To all whom it may concern:*

Be it known that I, WILLIAM J. WILCOX, of the city, county, and State of New York, have invented a new and Improved Apparatus for Refining Lard; and I do hereby declare that the following is a full, clear, and exact description of the same, reference being had to the accompanying drawings, forming a part of this specification, in which—

Figure 1 represents a longitudinal vertical section of my invention. Fig. 2 is a transverse vertical section of a portion of the same. Fig. 3 is a plan or top view of the same.

Similar letters of reference in the three figures refer to corresponding parts.

The object of this invention is to reduce the temperature of lard as the same passes from the heating-pan to the cooling-vat to such a degree that it requires but little stirring to bring it to the desired consistency.

The invention consists in the application or use in an apparatus for refining lard of a worm inclosed in a cask or tub which can be wholly or partially filled with cold water, said worm being connected at one end to a pipe emanating from the bottom of the heating-pan and at the other end to a spout discharging into the cooling-vat in such a manner that the lard in passing from the heating-pan to the cooling-vat is cooled down to such a degree that very little stirring in the cooling-pan is needed to bring the lard to the desired consistency fit to be packed in suitable tubs, barrels, or other vessels.

The invention consists, also, in the arrangement of a regulating-cock inserted into a pipe leading from the bottom of the cask which contains the worm to the waste-water or overflow pipe, in combination with the water-supply pipe and with the heating-pan, in such a manner that by opening or closing said cock the quantity of water in the cask, and with it the temperature of the lard passing through the worm, can be regulated, keeping the same at such a degree of heat that it flows freely from the worm without stopping up its own passage, and at the same time the temperature is reduced so that it requires but very little stirring to bring the lard to the desired consistency.

To enable those skilled in the art to make and use my invention, I will proceed to describe it with reference to the drawings.

A represents a pan, made of copper or other suitable material. The pan is placed in an elevated position either in a seat made in the platform B, or it may be put up in any other convenient manner, at such a height that the lard, after having been heated in the same, runs readily down to the worm C. The lard in the pan A is heated by steam, which is introduced through a pipe, *a*, and it (the lard) discharges through a pipe, *b*, leading from the bottom of the pan to the worm. This worm, which is a continuation of the pipe *b*, is inclosed in a cask, D, and its lower end connects with a spout, *c*, through which the lard, having passed down through the worm, is discharged into the cooling-vat E. The cask D is filled either wholly or partially with cold water, being supplied through the pipe *d*, which ought to be provided with a stop-cock, so that the supply of water can be stopped whenever desired. The surplus water runs off through the overflow-pipe *e*, which turns down to the ground on the outside of the cask. A short branch-pipe, *f*, leads from the bottom of the cask to the vertical branch of the overflow-pipe, as clearly shown in Fig. 2 of the drawings, and this branch pipe is provided with a cock, *g*, so that by opening said cock the water is drawn off from the bottom or lower part of the cask, and by closing said cock the water in the cask rises until it discharges through the overflow-pipe. By partially opening the cock *g* the water in the cask can be made to rise to any desired height between the branch pipe *f* and the overflow-pipe *e*, and at the same time a continuous current of water can be effected through the entire or any desired portion of the cask. Now, it is obvious if the cask is completely filled with cold water the lard passing through the worm will be in contact for a longer time with the cold sides of the latter, and its temperature brought down lower than if the cask is only partially filled with water, and, consequently, by means of a cock, *g*, the temperature of the lard discharging from the worm can be regulated.

In ordinary apparatuses for refining lard no worm is used, and the lard, after being heated in the pan A, is discharged directly into the vat E, and it has now to be continually stirred for eight to nine hours until it acquires the desired consistency. If the lard is not stirred while it cools, it grains and depreciates in value.

By the application of the worm nearly all the labor required for stirring the lard in the cooling-vat can be dispensed with, the temperature of the lard being reduced before it is discharged into said cooling-vat to such a degree that very little stirring will produce the desired consistency, and at the same time numerous experiments have proved conclusively that by the use of the worm the value of the lard is not affected when properly stirred. After having been discharged from the worm the lard retains its smoothness and no graining takes place. The peculiar nature of the lard, however, renders the regulating-cock $g$ indispensable for the correct operation of my apparatus. If the temperature of the lard in its passage through the worm should be reduced below a certain point, the lard will thicken and the worm will be stopped up.

By means of the regulating-cock the quantity of water in the cask can be so adjusted that the lard in being discharged from the worm is just hot enough to retain its fluidity, so that it flows freely from the spout $c$, and at the same time its temperature is so low that it thickens after having been stirred in the cooling-vat for from fifteen to thirty minutes.

By the application of the worm to an apparatus for refining lard much labor is saved, the quality of the article is not depreciated, and the additional cost of the apparatus is but slight in comparison with the great saving effected by it.

Having thus fully described my invention, what I claim as new, and desire to secure by Letters Patent, is—

1. The application or use, in combination with an apparatus for refining lard, of a worm, C, inclosed in a cask, D, constructed and operating substantially as and for the purpose herein described.

2. The arrangement of the regulating-cock $g$, in combination with the worm C, cask D, overflow-pipe $e$, heating-pan A, and cooling-vat E, all constructed and operating as and for the purpose specified.

WILLIAM J. WILCOX.

Witnesses:
TIMOTHY SHINE,
M. S. PARTRIDGE.